(12) United States Patent
Fleck et al.

(10) Patent No.: US 8,433,452 B2
(45) Date of Patent: Apr. 30, 2013

(54) METHOD FOR LOAD CONTROL USING TEMPORAL MEASUREMENTS OF ENERGY FOR INDIVIDUAL PIECES OF EQUIPMENT

(75) Inventors: Christopher K. Fleck, St. Louis, MO (US); Edward Kobeszka, St. Charles, MO (US); Mark Virkus, Wildwood, MO (US)

(73) Assignee: Aclara Power-Line Systems, Inc., St. Louis, MO (US)

( * ) Notice: Subject to any disclaimer, the term of this patent is extended or adjusted under 35 U.S.C. 154(b) by 734 days.

(21) Appl. No.: 12/558,122

(22) Filed: Sep. 11, 2009

(65) Prior Publication Data

US 2010/0070103 A1    Mar. 18, 2010

Related U.S. Application Data

(60) Provisional application No. 61/097,040, filed on Sep. 15, 2008.

(51) Int. Cl.
  *G06F 1/28* (2006.01)

(52) U.S. Cl.
  USPC ............. 700/296; 700/286; 700/295; 307/35; 307/39; 705/412

(58) Field of Classification Search ........... 700/295–296
  See application file for complete search history.

(56) References Cited

U.S. PATENT DOCUMENTS

| | | | | |
|---|---|---|---|---|
| 4,653,072 A * | 3/1987 | Vercellotti et al. | ............ | 375/340 |
| 4,819,180 A * | 4/1989 | Hedman et al. | ............... | 700/291 |
| 5,274,571 A * | 12/1993 | Hesse et al. | ................... | 700/291 |
| 5,675,503 A * | 10/1997 | Moe et al. | ..................... | 700/296 |
| 5,884,072 A * | 3/1999 | Rasmussen | ................... | 709/223 |
| 6,419,454 B1 | 7/2002 | Christiansen | | |
| 6,965,319 B1 | 11/2005 | Crichlow | | |
| 7,010,363 B2 | 3/2006 | Donnelly et al. | | |
| 7,149,605 B2 * | 12/2006 | Chassin et al. | ................ | 700/295 |
| 7,242,114 B1 | 7/2007 | Cannon et al. | | |
| 7,582,985 B2 * | 9/2009 | Murguia | ......................... | 307/39 |
| 7,606,639 B2 * | 10/2009 | Miyaji | .......................... | 700/296 |
| 8,010,240 B2 | 8/2011 | Mattiocco | | |
| 2003/0183018 A1 * | 10/2003 | Addink et al. | ............. | 73/861.69 |
| 2005/0143865 A1 * | 6/2005 | Gardner | ........................ | 700/291 |
| 2006/0129253 A1 * | 6/2006 | Menas et al. | ..................... | 700/22 |
| 2007/0021874 A1 * | 1/2007 | Rognli et al. | ................. | 700/295 |
| 2007/0043477 A1 * | 2/2007 | Ehlers et al. | .................. | 700/276 |

(Continued)

*Primary Examiner* — Kavita Padmanabhan
*Assistant Examiner* — Olvin Lopez Alvarez
(74) *Attorney, Agent, or Firm* — Polster, Lieder, Woodruff & Lucchesi, L.C.

(57) ABSTRACT

A method for load control in an electrical distribution system using energy usage profiles based on temporal measurements. A load control unit (10) installed at a customer site profiles equipment (E1-En) directly connected to the load control unit and remotely located equipment (RE1-REn) wirelessly connected to the load control unit using measurements of time rather than energy usage. This reduces the cost and complexity of the load control unit. Profiling is done for individual pieces of load controlled equipment rather than for the site as a whole. This improves data resolution. The load control unit controls the load only when the equipment is powered, and adaptively synchronizes load shedding during this time, so to improve local load control performance. Termination of a load control event results in gradual reduction in load shedding so to control the inrush of demand seen by the distribution system. Performance metrics related to the load control are provided to the utility such that complexity of the system is reduced through decreased computations.

38 Claims, 4 Drawing Sheets

U.S. PATENT DOCUMENTS

| | | | |
|---|---|---|---|
| 2007/0299562 A1* | 12/2007 | Kates | 700/295 |
| 2008/0133065 A1* | 6/2008 | Cannon et al. | 700/295 |
| 2008/0157938 A1 | 7/2008 | Sutardja | |
| 2008/0167756 A1* | 7/2008 | Golden et al. | 700/297 |
| 2008/0177423 A1* | 7/2008 | Brickfield et al. | 700/291 |
| 2008/0177678 A1 | 7/2008 | Di Martini et al. | |
| 2008/0215355 A1* | 9/2008 | Herring et al. | 705/1 |
| 2008/0281473 A1* | 11/2008 | Pitt | 700/291 |
| 2009/0174569 A1* | 7/2009 | Smith et al. | 340/825.49 |
| 2009/0240381 A1* | 9/2009 | Lane | 700/296 |
| 2009/0248217 A1* | 10/2009 | Verfuerth et al. | 700/295 |
| 2009/0302994 A1* | 12/2009 | Rhee et al. | 340/3.1 |
| 2010/0029117 A1* | 2/2010 | Underwood et al. | 439/304 |
| 2010/0076835 A1 | 3/2010 | Silverman | |
| 2010/0141442 A1* | 6/2010 | Matsuyama et al. | 340/541 |
| 2010/0145542 A1* | 6/2010 | Chapel et al. | 700/295 |
| 2010/0198713 A1* | 8/2010 | Forbes et al. | 705/34 |
| 2012/0074780 A1* | 3/2012 | Fleck | 307/35 |

* cited by examiner

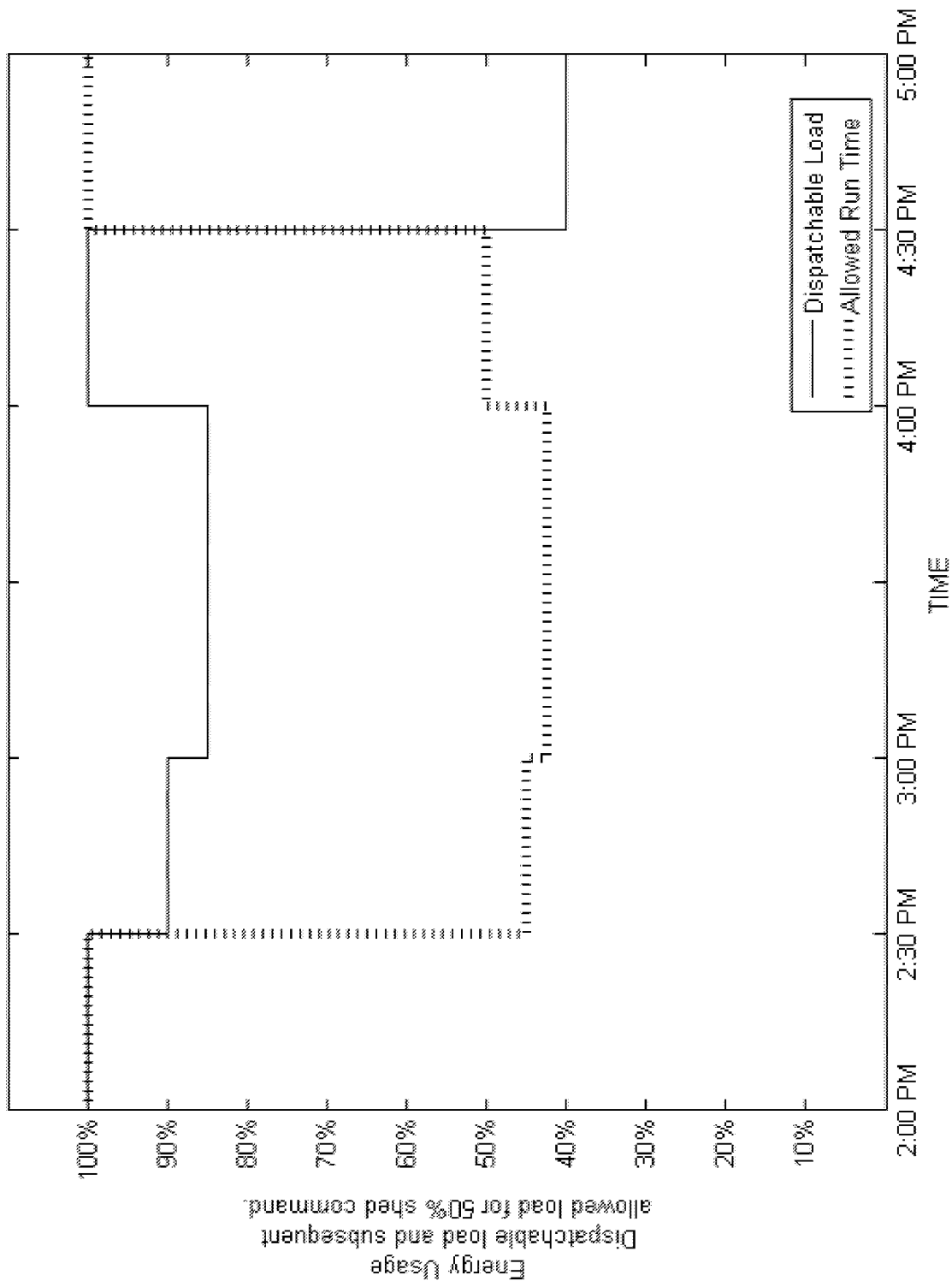

METHOD FOR LOAD CONTROL USING TEMPORAL MEASUREMENTS OF ENERGY FOR INDIVIDUAL PIECES OF EQUIPMENT

CROSS-REFERENCE TO RELATED APPLICATIONS

The present application is related to and claims priority from, U.S. provisional patent application 61/097,040 filed Sep. 15, 2008, which is incorporated herein by reference.

STATEMENT REGARDING FEDERALLY SPONSORED RESEARCH

Not Applicable.

BACKGROUND OF THE INVENTION

This invention relates to load control in an electrical distribution system; and, more particularly, to a method of performing load control using temporal measurements of energy usage by individual pieces of equipment connected to the system.

Electrical utilities must continually manage their capacity to ensure that the amount of electricity generated by the utility, or purchased from other utilities, is sufficient to meet the load demand placed on the system by their customers. Utilities generally have two options for meeting demands on the system during periods of peak energy demand (loading). These include either bringing additional generating capacity on-line to satisfy the increased demand; or, if properly equipped, shedding load across their customer base to reduce overall demand on the system.

Demand response thus refers to the reduction of a customer's energy usage at times of peak demand. It is done for a variety of reasons including system reliability (the avoidance of "blackouts" or "brownouts"), market conditions and pricing (preventing the utility from having to buy additional energy on the open-market at premium prices), and supporting infrastructure optimization or deferral. Demand response programs include dynamic pricing/tariffs, price-responsive demand bidding, contractually obligated and voluntary curtailment of energy usage, and direct load control/cycling.

When reducing demand, it is desirable to equitably distribute the necessary load shedding across the customer base. This is especially true where participation in load control programs is voluntary. In this regard, a number of methods have been proposed to manage load control fairly across a wide range of customers and their individual needs. These methods make use of demand and/or rate of demand as measured at a customer's site. This amount of "dispatchable" load, i.e., usage that can be shed at a given time, is calculated from these measurements and then used to formulate set points and/or generate control signals which directly affect the shedding of load.

Directly measuring energy usage, however, has a number of drawbacks. For example, to measure demand at a site, either a demand type metering device must be used, or a similar demand metering capability must be present in a load control device employed at that location. While some utilities may only employ demand measuring capability for a short time, i.e., until robust models are developed, even the short term deployment of a measuring capability may not only be cost prohibitive, but also require additional levels of system management. Also, measuring usage at the premise level does not provide an indication of usage patterns at the equipment level. The result is that control signals meant to control individual loads are based on global measurements that have been taken and which are applied equally across all controlled loads. Generally speaking, utilities are primarily concerned with usage on an aggregate level, and individual equipment level data is not considered. However, the ability to refine load control to a higher degree of resolution can produce greater accuracies and better performance in load control strategies a utility may potentially employ.

Accordingly, it is desirable to profile equipment energy usage in a way that does not incur the extra cost and/or complexity of load demand metering while not reducing the effectiveness of control. Furthermore, it is desirable to provide more than just profile usage at a customer's premise, but to also profile the usage for each piece of equipment individually. This is done so that the demand of each controlled device is factored in, so to promote a sophisticated control strategy which reduces the perceived impact by a customer on them during a load control event.

Another shortcoming of current load control methods is that, however calculated, the load control unit employed imposes an artificial duty cycle on operation of the controlled equipment. Even in the event that the control signal is computed from a usage profile of the equipment, the signal is imposed without regard as to whether the equipment is actually operating. That is, these methods have no mechanism which ensures that a piece of equipment (the "load") actually needs power at a time when a load control event is occurring. For example, if a piece of equipment is "off" and not needed or required to be "on", then it has no need either for power, or for a reduction in power, at that time. A method which attempts to determine or set the power requirement for equipment during a load control event is therefore imposing an artificial burden on the system.

In effect, in these prior load control systems, the control signal only sets an upper limit of usage on the equipment. This then implies that the equipment may not "call" for power, when it is allowed to call, and will not run, even if it could. This impacts the customer's perception of a load control event by giving the appearance of a higher amount of load being shed than actually is, in response to operation of the load control system. It is therefore desirable to improve upon load control methods where only an aggregate level of control is considered, by maximizing load control at the equipment level. It is further desirable to be able to synchronize those periods during which equipment is allowed to run with those periods when the equipment is actually calling for power. Certain loads, those driven by thermostats, for example, will "self-synchronize" with the load control as they continually endeavor to reach certain set points. However, many loads are driven only on a time basis, or by some other mechanism, that does not "self-synchronize" with load control signals.

When load control is performed, the utility prefers to have some form of feedback as to the effectiveness of the load control commands. Most of the existing ways of providing this feedback involve either using metering data obtained from the premise before, during, and after the load control event to verify that load control was performed; or, to use counters that indicate how many times power to the device was cycled "on" and "off". The former method requires that data be monitored and generally requires additional equipment in the load control system to make the measurements. The latter method does not give a measure of effectiveness straight away. Rather, calculations are performed to determine if it can be inferred that a piece of equipment was cycled "off" ahead of when it otherwise would be, thus indicating that load was shed. Even load control methods employing sophisticated models have an operational disadvantage because of the number of computations needed to provide meaningful feedback to a utility.

In addition to the complexities inherent in the modeling, the resulting models do not necessarily reflect the fact that a given consumer might suffer from, for example, air-conditioner under-capacity. What might appear from the utility's perspective to be a very good load to shed because it runs all of the time, might be from the customer's perspective a very bad load to shed because it needs to run all of the time. The customer may, for example, experience undue discomfort when the program is executed, and opt out of the program, which is not a favorable result for the utility. To avoid this situation, some utilities study their customer's appliances and usage habits, and refine their models accordingly. Some load control systems employ counters for this purpose and are thereby able to monitor equipment cycling in such a way as to keep their customers comfortable. It will be appreciated that this requires a great deal of planning and forethought. The present invention attempts to keep individual customers comfortable without requiring sophisticated modeling by the utility. To accomplish this, it is desirable to have a load control unit (LCU) both perform the load control and to directly report its performance back to the utility. Doing so reduces the need for additional system resources, and reduces the number of calculations needed to be performed by the utility.

A final identified item is an alternative to traditional load control methods of dealing with additional loading on the electrical network when the load control event is over. At the time that equipment is allowed to come back online, all of it may simultaneously switch "on" and significantly increase the level of demand on the system as the equipment attempts to heat water, lower room temperatures, etc. This increased demand is counter-productive to the original need for load control. Indeed, if the need for load control was triggered by a reliability concern, then this increase in demand may retrigger the event and load control will start over again. One method of managing this situation in current load control methods is to employ time diversification by which controlled loads are randomly brought back on line in order to spread any in-rush current that is generated over a longer time period, thus reducing peak loads. An alternative posed by this invention is to gradually ease all of the equipment back online and so slowly reduce the amount of load being shed. This method does not require time diversification. Instead, all loads are treated equally with respect to timing while the magnitude of load shed is gradually reduced over a period of time until all of the loads are fully brought out of control. In accordance with the invention, this is readily accomplished since the loads are controlled at the equipment level, and this provides a natural diversification.

In the discussion that follows, it is important for those skilled in the art to understand that the terms "usage", "energy usage", "profile", "usage profile" and related terms, as used herein, do not refer to the amount of energy (amps or watts) a piece of equipment is consuming at any particular time. Rather, what is referred to is the amount of time the piece of equipment is running during a defined interval (half-hour, hour, day) regardless of the level of consumption. It will also be understood that certain equipment (e.g., an air conditioner) may be continuously drawing current; albeit a relatively low amount of current as compared to when the equipment is performing its actual function (i.e., cooling a space). For purposes of operation of the invention, a piece of equipment is considered to be "on" or running, whenever its level of energy consumption exceeds a predetermined threshold level specific to that piece or type of equipment, regardless of the various amounts of energy thereafter consumed at different times when the equipment is running.

BRIEF SUMMARY OF THE INVENTION

The present disclosure is directed to a method by which load control is performed either by direction (remotely or locally), or autonomously, in a load control unit (LCU) installed at a given location. An LCU employing the load control method of the invention is able to reduce load in such a manner that the perception of load shedding activity by a person at a location where an LCU is installed is greatly reduced, if not eliminated. The method of the invention provides an improvement over previous load control methods wherein the control of each individual piece of equipment is based on a combination of past and current usage data of the equipment. Additionally, the method by which equipment is profiled is such that the cost and complexity of performing load control is significantly reduced. Further, the method eliminates post load control event problems by easing equipment back into normal operation and reducing the inrush of demand which may otherwise occur at the end of the event.

As installed, an LCU is connected to equipment to be controlled either through the utility's distribution network or over a wireless, RF connection. Once in operation, the LCU profiles operation of the equipment connected to it. The method for characterizing demand at a user site is the duration of time the equipment is powered. In general, the type of equipment typically connected to an LCU includes large appliances such as air conditioners, clothes dryers, water heaters, heat pumps, irrigation pumps, pool pumps, hot tubs, industrial sized inductive motors, etc.; rather than smaller appliances such as toasters and televisions.

Each type of controlled equipment has different operating characteristics. Some units, such as air conditioners, cycle on and off as they work to track or maintain a temperature about a set point. Other units, such as industrial sized motors, run continuously for the duration of a work shift and then are shut off at the end of the workday. Knowing the amount of time a piece of equipment operates over a given period of time is sufficient to prepare a first order estimate (usage profile) of actual energy usage. The typical operating period for larger appliances is sufficient for load control purposes while reducing the need for a demand metering capability.

A second benefit of the method of the invention is the relative simplicity in determining whether a piece of equipment is operating, completely shut off, or in a standby mode. Because of this simplicity of measurement and reduced cost for the measurement circuitry, each controlled load is individually measured and characterized, so to achieve better resolution during load control. For example, in a load control event where a certain percentage of energy usage has to be shed, applying the control equally across all of the equipment ensures that each device receives an allotment of energy; rather than having one high usage device receive a preponderance of the allotted energy with all of the other devices being substantially shut down.

The LCU profiles equipment's electrical usage for a specified period of time which is limited only by instances of its use. The resulting time period based usage profile is updated on a continual basis during non-controlled periods of equipment usage which is one in which load control is not active, and has not been active for a configurable period of time after the last load control event has ended. This configurable period of time is important because it mitigates the effects the previous load control event had on the equipment. Updating of usage profiles is done in such manner that effects of data from prior usage are adjusted in light of newly accumulated usage data with the resulting change affecting the usage profile of the equipment in accordance with the utility's preference. This allows the nature of the profile to vary based on the utility's preference for given events such as replacing the piece of equipment connected to a particular control port of the LCU, a change in the occupancy or use of a premise, changes in the season, etc.

When load control is activated by a local or remote mechanism, the method of the present invention uses the profile, load control command parameters, and equipment short cycle limits, to calculate a desired amount of time a particular piece of equipment is allowed to run; this, in turn, determining how much load is to be shed. The calculations are performed using any of a number of algorithms which include the duty cycle of equipment, total allowed run time, and the current state of the load (which may change over time), etc. Regardless of the algorithm employed, the net result is a duration for which a piece of equipment is allowed to run over a given period of time. Further, the allowed run time may change over time during a load control event.

The LCU employed with the method of the invention tries to optimize load shedding by a piece of equipment, and in doing so, attempts to ensure a reasonable match between the equipment's usage profile and its actual behavior during a load control event. Doing so enhances the efficiency of the load control operation. That is, a piece of equipment's usage profile can provide information as to when the equipment will be energized, indicating a need for electrical energy. At such time, and in accordance with the method of the invention, the LCU to which the equipment is connected allows the equipment to run for a predetermined period of time. When this time expires, the LCU interrupts supply of power to the equipment and load is shed. This interruption lasts for an amount of "shed time" based on the usage profile for the piece of equipment and the amount of load reduction desired. After this "shed time" has passed, power can again be supplied to the equipment (if the equipment is to be powered at this time); and, if powered, the equipment is allowed to run for a new, adjusted run time, again presenting a load to the system. This cycling process continues for the duration of the load control event.

An important feature of the invention is the use of a "time diversity" protocol which provides for more efficient load control during an event. Time diversity enables load controllers to stagger when a load reduction occurs in a piece of equipment at the beginning of an event and when the load restriction on the piece of equipment is removed when the event ends. This feature, together with the load control programmed into the LCUs for the affected equipment, provides a utility a significant amount of flexibility in handling load control throughout the event The method of the invention also provides feedback as to the effectiveness and performance of the control strategy.

Other objects and features will be in part apparent and in part pointed out hereinafter.

BRIEF DESCRIPTION OF THE SEVERAL VIEWS OF THE DRAWINGS

The objects of the invention are achieved as set forth in the illustrative embodiments shown in the drawing which forms a part of the specification.

DESCRIPTION OF THE INVENTION

Figure 1:
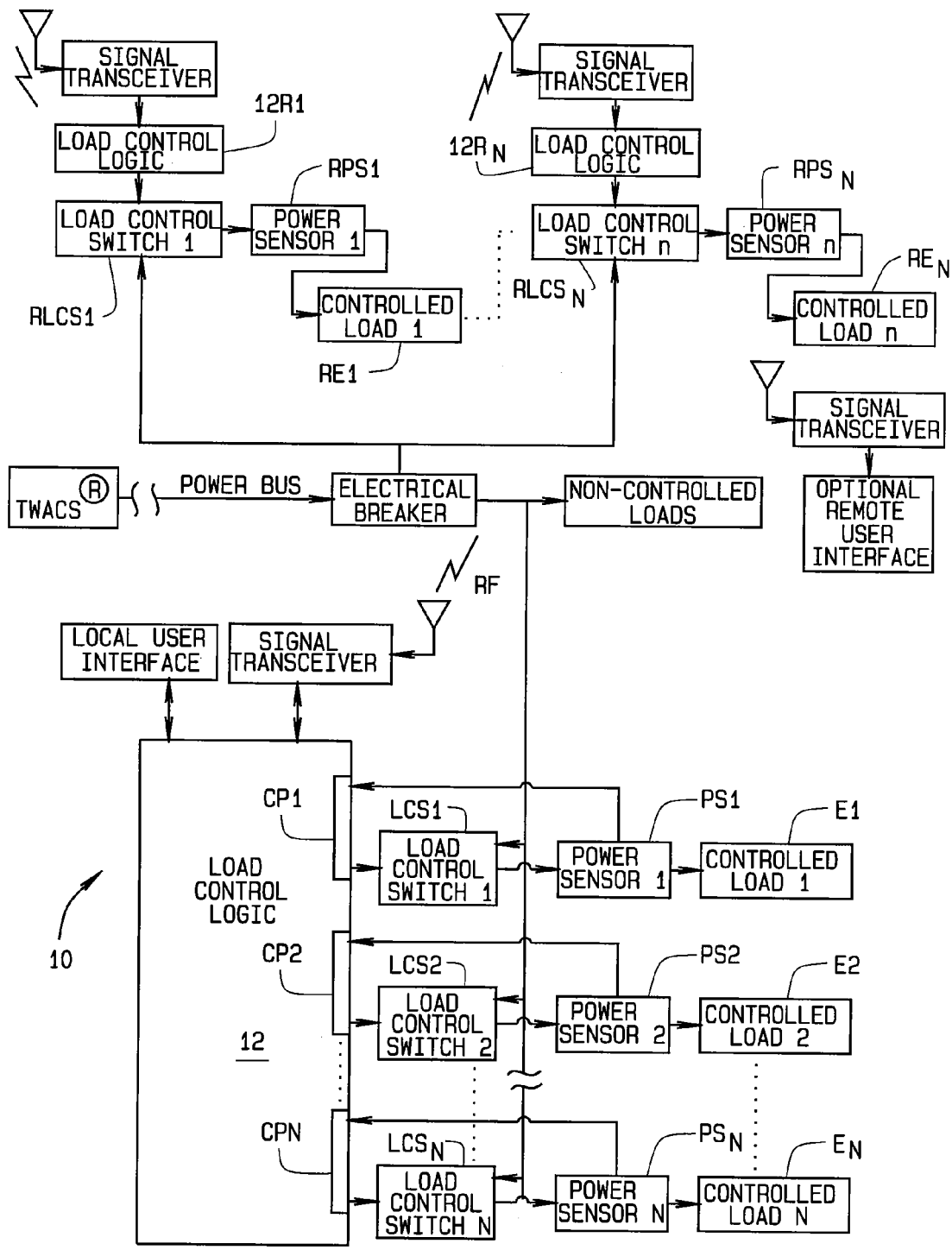
FIG. 1 is a block diagram of an installation of the load control system of the present invention.

The following detailed description illustrates the invention by way of example and not by way of limitation. This description clearly enables one skilled in the art to make and use the invention, and describes several embodiments, adaptations, variations, alternatives and uses of the invention, including what is presently believed to be the best mode of carrying out the invention. Additionally, it is to be understood that the invention is not limited in its application to the details of construction and the arrangement of components set forth in the following description or illustrated in the drawings. The invention is capable of other embodiments and of being practiced or carried out in various ways. Also, it will be understood that the phraseology and terminology used herein is for the purpose of description and should not be regarded as limiting.

Referring to FIG. 1, a load control unit or LCU generally indicated 10 is installed at a customer's site. The LCU is attached either directly to each piece of locally controlled equipment E (indicated E1-En), or wirelessly (via RF) to each remotely controlled piece of equipment RE (indicated RE1-REn), at that location that is to be load controlled. During installation, information (including each piece of equipment's short cycle limits) is either programmed into the LCU, or recorded and sent to the unit via a communications link. Once all necessary connections are made, the LCU is powered and normal operation begins. The LCU is programmed with an algorithm by which it affects the shedding of load when a load control event subsequently occurs.

A load control logic unit 12 of LCU 10 monitors, records, and updates usage profiles of the pieces of equipment, whether these pieces are connected directly or wirelessly to the LCU. The LCU includes a plurality of control ports CP1-CPn through which equipment is directly connected to the LCU; as well as a plurality of remote control ports for the remotely located equipment RE1-REn. Load control commands promulgated by LCU 10 are supplied to a load control switch LCS1-LCSn for the respective pieces of equipment being directly controlled.

For the remotely located equipment, control switches RLCS1-RLCSn, sensing circuitry RPS1-RPSn, and load control logic units 12R1-12Rn are located in proximity to the equipment so that an RF wireless link may, for example, be provided by LCU 10. Now, LCU 10, in effect, acts as a modem passing commands to the remote load control logic units 12R1-12Rn. The respective remote units then individually determine how to control (shed) the load to which each unit is connected. In another embodiment of the invention, LCU 10 receives a command to shed X % of the load connected to it (either directly or wirelessly). The LCU then ranks the respective loads controlled by the various load control logic units, determines how to distribute the X % among them and sends appropriate commands to the various units. Regardless of the control strategy employed, the setup shown in FIG. 1 provides a great amount of flexibility for the LCU and enhances its ability to control a wider range (both in regards to type of, and distance from the LCU) of equipment. Operationally, the pieces of remote equipment RE are profiled by the load control logic units of the LCU 10 in proximity to them. Each load control logic unit then stores the usage profile for its associated piece of equipment and controls the shedding of load by the piece of equipment during a load control event, as further described hereinafter.

Over time, the load control logic units 12 profile energy usage of each piece of controlled equipment E or RE. The resulting profiles subsequently allow each piece of equipment E1-En and RE1-REn to be individually controlled in a manner unique to that particular piece of equipment. This is advantageous in that, for example, during a load control event, it allows an air conditioner to be operated in a way tailored to its normal operating cycle; while a water heater or pool pump is operated in different manner in accordance with their normal operating cycles.

The load control logic units 12 continuously, or periodically, monitor each piece of controlled equipment to determine those periods of time during which the equipment is "on" or operating. This monitoring function involves sensing the difference between standby power usage and operating power usage, and is done using a power sensor PS1-PSn for locally controlled equipment, or a remote power sensor RPS1-RPSn for the remotely controlled equipment. As part of this sensing function, each load control logic unit 12 makes a distinction between standby operation of a piece of equipment and normal operation of the equipment. This is because a piece of equipment E or RE typically draws a different amount of power when in its non-operational, standby mode versus when it is fully operational. For example, even when an air conditioning unit is running but not cooling, per se, it is still drawing some power. When a piece of equipment changes from its standby to operational mode, the power sensor connected to it senses the change in energy usage level and provides this information to its associated load control logic unit 12 which notes that the equipment is now in its operating state.

Figure 2:
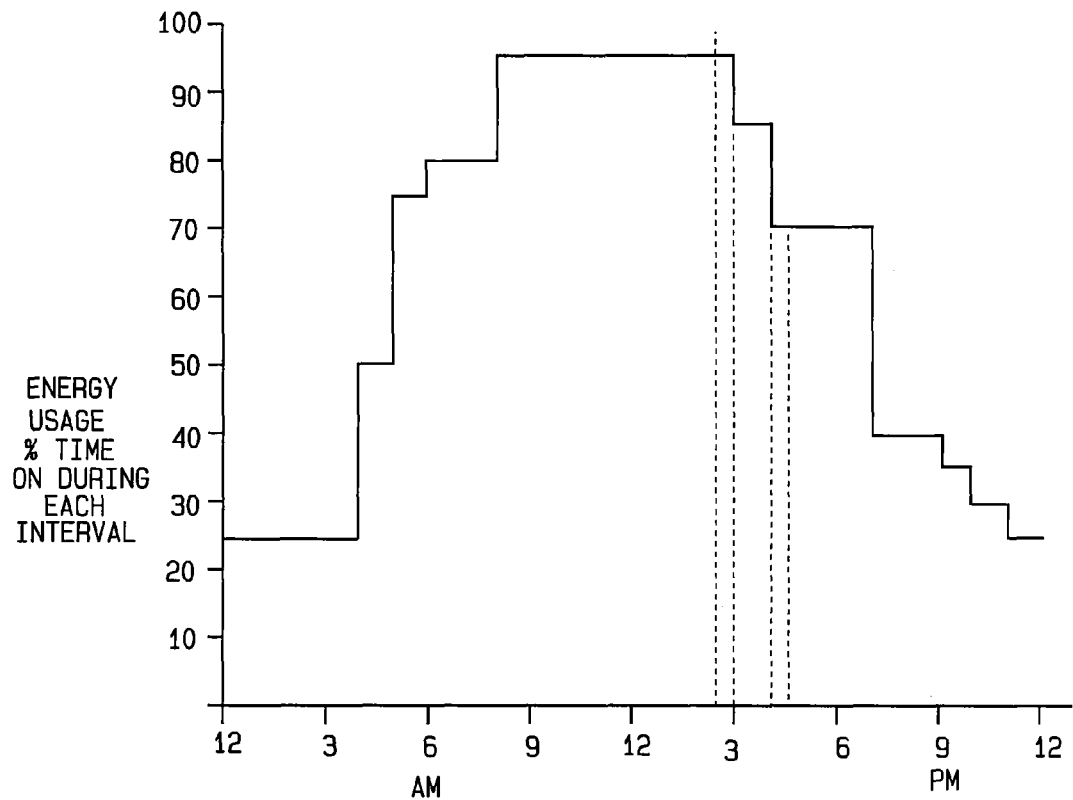
FIG. 2 is an exemplary usage profile for a load controlled piece of equipment and, FIG. 2A is a usage profile representing dispatchable load for load controlled piece of equipment during a load control event.

Each load control logic unit 12 records the length of time its associated equipment remains in its operating state during the entire time interval over which the energy usage profile is drawn. It will be understood by those skilled in the art that the time interval over which the profile is taken may be divided into sub-intervals. This enables a load control logic unit to better characterize energy usage over the period of time for which the profile is drawn, and depending upon the type of usage parameters utilized by LCU 10 (time, usage level, etc.) affects how much data must be stored in the LCU for load control purposes. FIG. 2 is a representative profile in which the time interval is one hour (1 hr.) and encompasses a twenty-four hour period from midnight to midnight. In FIG. 2, the graph indicates how long the piece of equipment is "on" during each hour. As shown in FIG. 2, the piece of equipment is typically shut-off or on standby power during the early morning period. As the morning progresses, the equipment is more in use, but its peak usage occurs between mid-morning and mid-afternoon. Thereafter, as the afternoon progresses into evening, the piece of equipment is used less and its usage level returns back to its midnight starting level.

The energy usage profile for each piece of equipment E can be continuously, or periodically, updated with newly recorded data being incorporated into the equipment's usage profile so as to produce an updated profile of energy usage. How a piece of equipment's profile is updated depends on a utility's preferences. A utility may, for example, update the profile (or create a new profile) when a piece of equipment is changed, when the occupant of a residence or premise changes, or when there is a change in seasons. Whenever the profile is updated, the utility controls how any new data is incorporated with previously acquired data to update the profile. For example, under some conditions such as a change in occupant, the usage profile may be updated with new data samples such that all the data samples (new and old) are equally weighted. However, with seasonal changes such as when summer transitions into fall, the utility may weight the newer usage data more heavily than the older data. For example, the usage profile relating to an air conditioning unit will most probably change drastically as the outside temperatures begin to cool. Also, energy usage profiling is suspended during, and for a period of time subsequent to termination of a load control event, so the effects of load control during the event do not affect the profile. It will be understood by those skilled in the art that changes to system time (i.e., conversions from standard to daylight savings time and back) will affect load control and the profiling. This is because the time bins (intervals) in which profile data is stored will shift. LCU 10 then must shift accordingly to insure that the current measured usage occurs in the now correct interval and load control occurs at the right time.

Once an energy usage profile has been established, LCU 10 controls power flowing to the equipment using direct and/or autonomous load control commands. A direct load control command is issued in a number of ways. For example, it can be remotely sent to LCU 10 from the utility using a communications link such as a two-way-automatic communications system or TWACS®, or by RF communications. It can also be issued locally using a personal computer (PC), or a handheld device. Local communications may be wired or wireless.

Autonomous load control commands are self generated by LCU 10 which is programmed with a set of instructions or rules according to which load control commands are issued. For example, LCU 10 will monitor its own input power (voltage and frequency) and based upon variations in these, typically an under-voltage or under-frequency condition which persists for longer than a predetermined time period, decide to protect the customer's equipment and the utility from a potential brown out condition, by issuing a load control command. At any given time, the operational state of LCU 10 can be displayed to a local user via a directly connected user interface or via a remote interface.

Direct and autonomous load control commands are generated at any given time, even while other load control commands are being executed. Management of multiple load control commands relies on pre-established priority schemes that dictate the particular command with which LCU 10 must comply when conflicting commands occur. Tables 1 and 2 below outline two exemplary command priority schedules LCU 10 may employ. The first list (Table 1) of priorities sets forth the ability for an emergency SCRAM (full load shed) command by LCU 10 which takes priority over all load control commands; but which also sets forth other autonomously generated commands that take precedence over all remaining load control commands. The second list (Table 2) of priorities highlights the giving of preference of any utility generated (remote) command over any autonomous command, with the exception of a command that attempts to shed more than 50% of the profiled load.

TABLE 1

Load Control Command Priorities

| Priority | Load control Command Type |
| --- | --- |
| 1 | Direct/Remote: Full Load Shed - |
| 2 | Direct/Local: Full Load Shed - SCRAM |
| 3 | Autonomous: Under Frequency |
| 4 | Autonomous: Under Voltage |
| 5 | Direct/Local: Last Command |
| 6 | Direct/Remote: Last Command Received |

TABLE 2

Load Control Command Priorities

| Priority | Load control Command Type |
| --- | --- |
| 1 | Direct/Remote: All Commands |
| 2 | Any command to shed more than 50% of profiled load |
| 3 | Direct/Local: Last Command Received |
| 4 | Autonomous: Under Frequency |
| 5 | Autonomous: Under Voltage |
| 6 | Autonomous: Power Factor Out of Bounds |

Once a particular load control command is accepted, LCU 10 determines when to switch-in or switch-out power to the controlled equipment. The decision is made by evaluating each piece of equipment's usage profile in light of both control command parameters and the piece of equipment's short cycle limits. Short cycle limits are used to prevent what is known as "short cycling" of a piece of equipment and typically involves load protected equipment that uses compressors. Short cycle limits define a minimum run time (MRT) and a minimum shed time (MST) for a piece of equipment so as to protect the equipment. For example, equipment using compressors must be given adequate time for pressures to equalize within the equipment before the equipment's power is cycled "on" or "off". In addition, each piece of equipment typically has different short cycle limits which are based on the respective design of the equipment. This information is programmed into LCU 10 and taken into account by the LCU in determining when load control signals are to be sent to individual pieces of equipment so that pressure builds up in a piece of equipment's compressor, when the equipment is shut down, is given time to equalize so the unit can be safely turned back on. It will be understood that a similar concern exists with turning the piece of equipment off prematurely. This is further discussed hereafter with respect to FIG. 3.

Further with respect to short cycle limits, LCU 10 utilizes a "masking" feature to protect individual pieces of equipment. This masking feature overrides calculated load shed patterns for the load controlled pieces of equipment. Such patterns can be thought of as static; whereas, the method of the invention, as described herein, uses real time load measurements to control cycling. This then dynamically modifies the control pattern for a piece of equipment.

Load control command parameters take a number of forms. For determining a percentage of dispatchable load, the parameters include, for example, the piece of equipment's usage profile and the duration for which a determined percentage X of load is to be shed. Or, the load command may stipulate that a specified amount of load be dispatched, regardless of the duration of shedding. However determined, the result is that a portion of electrical load will be shed from specified equipment based upon those parameters programmed into LCU 10. Since usage profiles exist for all load controlled equipment connected to the LCU, the load control parameters are applied to each piece of equipment's profile independently. One result of this is that it allows for load shedding to be appropriately distributed across all the controlled equipment connected to the LCU.

The following is an example of the method of load control in accordance with the invention and with respect to the load profile of FIG. 2 and FIG. 2A. A particular piece of equipment comes under load control via an autonomously generated load control command. The command dictates that 50% of the equipment's electrical load be shed for two hours beginning at half past the hour. This is indicated by the dashed line at the 2:30 PM mark on the graph of FIG. 2 at which time equipment usage level is 95%. That is, the equipment is "on" 95% of the time during this interval. The equipment's usage profile is segmented into sub-intervals of one hour coinciding with the interval duration, starting at the top of each hour rather than at the half-hour, quarter-hour, etc. Accordingly, for the time interval from 2:00-3:00 PM, the piece of equipment whose usage is profiled in FIG. 2 would be "on" for 57 minutes (i.e., 60 minutes times 0.95=57 minutes). Further, in consideration of local memory requirements, the piece of equipment's energy usage profile contains a record of the average duration of usage per interval rather than a full time varying waveform of the recorded duration of usage. In this example, the portion of the usage profile which is used includes three intervals; a 30 minute interval for the last half of the current hour (or from 2:30-3:00 PM), a full hour interval for the next hour (or from 3:00-4:00 PM), and a 30 minute interval for the first half of the succeeding hour (or from 4:00-4:30 PM). (See Table 3, Row 2, Control Interval Definition). According to the equipment's energy usage profile, each sub-interval has an associated amount of dispatchable load which amount may be different for each sub-interval. In FIG. 2, this is 95% for the first interval from 2:30-3:00 PM, 85% for the second interval from 3:00-4:00 PM, and 70% for the third interval from 4:00-4:30 PM. (See Table 3, Row 1 Dispatchable Load per Load Profile).

Because the first control interval is only a portion of an hour, the dispatchable load during this period is reduced and this reduction is based on the portion of the load used during the first 30 minutes of the hour (i.e., from 2:00-3:00 PM) for which the last 30 minutes (i.e., from 2:30-3:00 PM) comprises the first control interval. In this example, let the load have been "on" for all 30 minutes between 2:00 and 2:30 PM, as determined by the LCU 10 power sensor PS1 prior to the start of the load control event (see Table 3, Row 3 Actual Load Used Prior to LC Event). This is 100% of the time for the first half of the one-hour interval, from 2:00-3:00 PM. As a result, the dispatchable load for the first full control interval from 2:30 to 3:00 PM will be based upon 27 minutes. That is, 57 minutes (95% usage for the full hour per FIG. 2) minus 30 minutes (the amount of time the equipment was actually on between 2:00-2:30 PM=27 minutes. 27 minutes equates to 90% of the time available during the interval between 2:30-3:00 PM (see Table 3, Row 4 Dispatchable Load per Load Control Event Interval). Since the load is to be reduced by 50% (0.5) during the load control event, the "on" time of the piece of equipment will now be 45% of the available time since 90% times 0.5 equals 45%. As shown in Table 3, Row 5, this means the equipment should be "on" for 13.5 minutes of the time between 2:30-3:00 PM.

Because the second sub-interval comprises a full hour according to the usage profile, the full dispatchable load, or 85%, is available during the control interval. As shown in the FIG. 2 profile, for the interval between 3:00-4:00 PM, "on" time for the equipment is 85% or 51 minutes (60 minutes times 0.85 equals 51 minutes). Since the dispatched load is to be 50% (0.5), this equates to 42.5% usage during this one hour interval. That, in turn, as shown in Table 3, Row 5, means the piece of equipment will be "on" for 25.5 minutes during this time.

TABLE 3

Simplified Load Control Calculations for Amount of Time Load is Allowed to Run

|  | Profile Subinterval 2:00-3:00 pm | | Profile Subinterval 3.00-4:00 pm | Profile Subinterval 4:00-5:00 pm | |
| --- | --- | --- | --- | --- | --- |
| Dispatchable Load Per Load Profile | 95% (57 min.) | | 85% (51 min.) | 70% (42 min.) | |
| Control Interval Definition | Non-control period | Interval 1 2:30-3:00 pm | Interval 2 3:00-4:00 pm | Interval 3 4:00-4:30 pm | Non-control period |
| Actual Load Used Prior to LC Event | 100% (30 min.) | Not Applicable | Not Applicable | Not Applicable | Not Applicable |
| Dispatchable Load per Load Control Event Interval | Not Applicable | 90% (27 min.) | 85% (51 min.) | 100% (30 min.) | Not Applicable |
| Allowed Load Run Time per 50% Shed Command | 100% (Not in control) | 45% (13.5 min.) | 42.5% (25.5 min.) | 50% (15 min.) | 100% (Not in control) |

Lastly, for the final sub-interval between 4:00-4:30 PM, the amount of dispatchable load can be the lesser of two values. That first is that of the first 30 minutes of the hour between 4:00 and 5:00 PM (or 100% of the partial interval. The second is the dispatchable load for the entire hour between 4:00 and 5:00 PM. For this last control interval between 4:00 4:30 PM, 70% of the full interval (i.e., 42 minutes) is greater than 100% of the partial interval (i.e., 30 minutes). Therefore, the final control interval will be 100% of the dispatchable load, or 30 minutes. Since the dispatched load is 50% (0.5), 30 minutes times 0.5 equals 15 minutes which is the "on" time for the piece of equipment as shown in Table 3, Row 5.

Again, it is important to understand in accordance with the invention that dispatchable load is measured in units of time, not watts or other electrical measure. The assumption made with regard to the final interval in the above example is that once the piece of equipment is under load control it may otherwise be shut down and so not be running for a portion of the previous load control intervals. Thus upon entrance into the final interval, the load will attempt to make use of all dispatchable load as soon as it is made available. The implication of this is that all dispatchable load of the final interval must be made available as early as possible in this interval.

Another factor to be considered is that in some instances, and as previously discussed, depending on short cycle limits, the duration of a load control period, and the time at which the control command is processed, certain sub-intervals may be too small to accommodate a full control cycle. In such instances, these sub-intervals are absorbed into the next sub-interval. This is referred to as "interval absorption" and its effect on performance of the load control strategy implemented by LCU 10 is negligible. Short cycle limits tend to be on the order of a few minutes, meaning that in order for an interval to be absorbed into the next interval, the dispatchable load involved is small.

Figure 3:
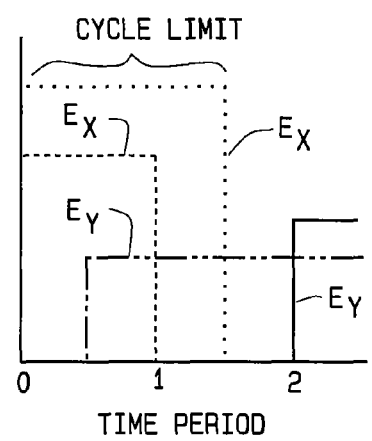
FIG. 3 illustrates certain situations when a piece of equipment is allowed to run even though, in accordance with its usage profile, it would not otherwise be allowed to; and, FIGS. 4-6 illustrate how usage of the time diversity feature of the invention provides a utility greater control over load demand at the beginning and end of an event.

Referring to FIG. 3, the dashed line indicates a piece of equipment Ex representing a dispatchable load which is to be shed at the end of time period 1 and the commencement of time period 2. However, if piece of equipment Ex has a cycle time which requires it to remain "on" past this time; then, as indicated by the dotted line, LCU 10, in accordance with the invention, maintains the equipment "on" until the expiration of the cycle time. At the end of this time, the load represented by equipment Ex is shed. Conversely, if a piece of equipment Ey is supposed to come back "on" halfway through time period 1, as indicated by the broken line, but has a cycle time which requires it to remain "off" until the end of time period 2, the equipment will stay "off" until the end of time period 2 and then come back "on" as indicated by the solid line.

As each sub-interval and its associated amount of dispatchable load are accounted for, load control is applied while continuing to factor in the any short cycle limit for the equipment. The dispatchable load for each control interval is reduced by the desired shed amount (50% in the example). (Table 3, Row 5)This remaining amount of dispatchable load, or allowed run time, is then evenly spread out across the control interval by the number of control cycles involved such that the cycles do not violate any short cycle limit of the appliance. Where multiple pieces of equipment have dispatchable load, the load control logic units 12 for this equipment are commanded by LCU 10 to begin shedding this load randomly. Thus, rather than a number of pieces of equipment being shut-off substantially simultaneously, these loads are instead shed over a somewhat longer interval. In turn, this extends the switching schedule boundaries.

The cycle times computed are continuously adjusted based on when the piece of equipment is "calling" for power. If the load does not "call" for power during an interval when it is allowed to run (i.e., the appliance is shut-off at this time), then LCU 10 considers it to still be in a period of load shedding imposed by the appliance rather than the conditions which instituted the load control event. As time goes by, the remaining portion of the sub-interval's duration is reduced, and this may affect sub-interval cycle control parameters.

If the piece of equipment now calls for power (e.g., the user turns it "on"), the amount of dispatchable load is reduced as power is supplied to the piece of equipment. This is because the equipment now adds a load to the system. The equipment is allowed to run for the time specified by cycle control parameters computed for the sub-interval in which the piece of equipment is brought back on line. If the piece of equipment subsequently is still online, and the allotted duration for allowing the equipment to run, as computed by load control logic unit 12, expires, LCU 10 sends an appropriate load shed command to the load control switch for that piece of equipment. Now, the piece of equipment E is held off for the time defined by cycle control parameters. Once the specified time, again as determined by load control logic unit 12 has elapsed, a new cycle begins and the process repeats itself for the remainder of the control period. As time progresses and LCU 10 moves from one sub-interval to the next, the amount of dispatchable load may change as will the cycle control parameters.

In addition to load shedding in the manner described above, in which load shed is based upon a piece of equipment's energy usage profile, load can also be shed using a "capping" protocol incorporated within the method. Here, load shedding is based upon an assumed, rather than an actual, energy usage profile. The assumed profile represents the maximum dispatchable load for a given piece of equipment for a given interval. As such, it is equivalent to the length of time of the interval.

Once the event is over, in one embodiment of the invention, the equipment is "eased" back into full usage to prevent undue loading effects on the utility's electric grid. This is because if all the equipment controlled by LCU 10 were to now come back online at approximately the same time, the utility would see a large spike in demand. This is counterproductive with regard to the load control event which just expired. In accordance with the method of the invention, easing loads back online gradually reduces the amount of shed load over a predetermined time period or number of load cycles. As the different pieces of controlled equipment are brought back online, the demand seen by the utility slowly ramps up to a normal operating level. Otherwise, there may be an immediate recurrence of the load control event. Doing this does not require any time diversification. Rather, all loads are treated equally, with respect to timing, so that the amount of load shed is gradually reduced over a period of time until all of the loads are fully brought out of control by the LCU.

In an alternate embodiment, the load is brought back online by extending the period of control for each piece of load controlled equipment with this period being separately chosen for each piece. This provides a time diversification for re-establishing load.

Figure 4:
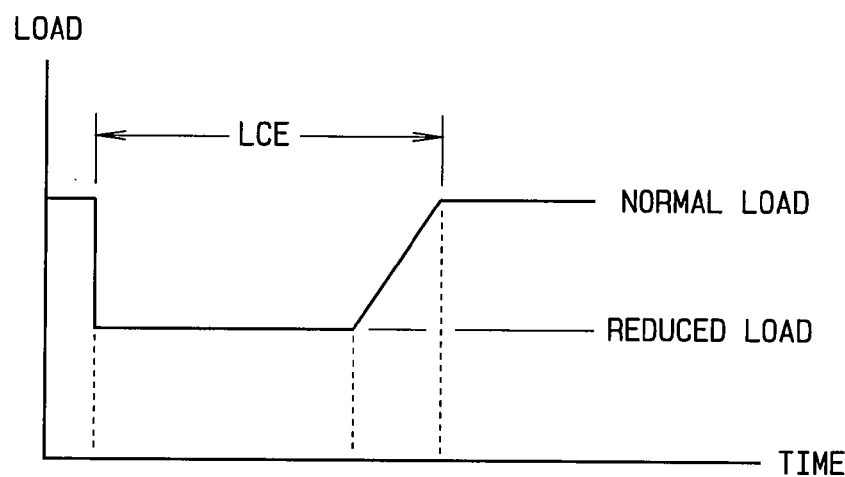
Figure 5:
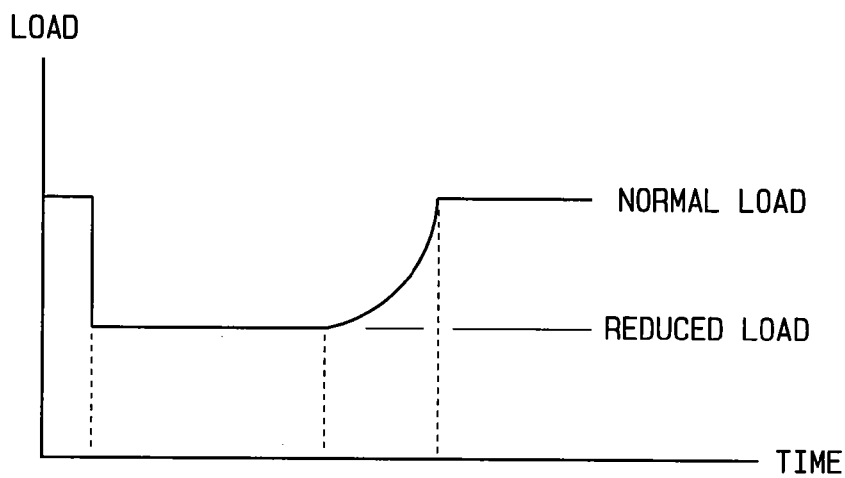
Figure 6:
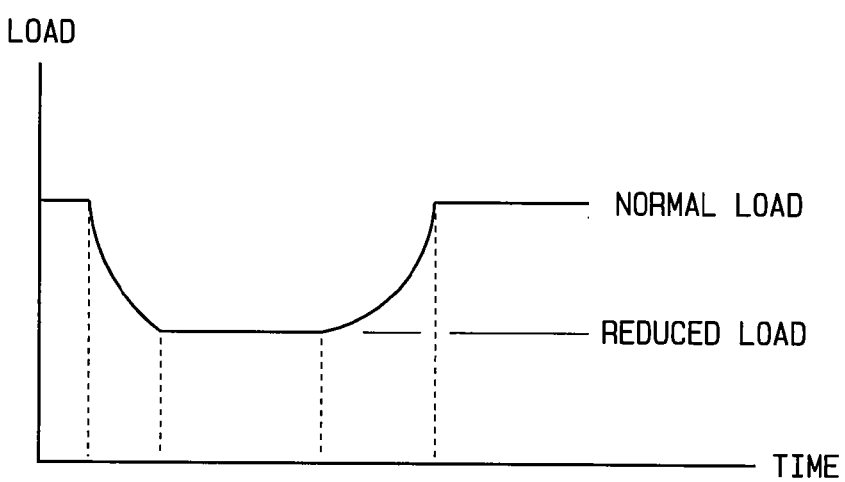

Referring to FIGS. 4-6, the time diversification or time diversity feature of the invention is illustrated. Those skilled in the art will appreciate that the abruptness or gradual transitions shown in FIGS. 4-6 are representative only, and that the actual transitions and resulting profiles shown in these drawings are a function of various conditions within and without the electrical distribution system at the time a load control event begins and ends. In FIG. 4, without time diversity, when a load control event LCE is declared, the LCUs within the affected area immediately reduce the load demand presented by the equipment under their control so the overall load is substantially immediately reduced from the normal load level to the reduced load level. At the end of the event, the LCUs bring the equipment under their control back to whatever is the normal load for that equipment at that time. As previously noted, if the utility is not careful, this sudden increase in load can trigger a new LCE.

FIG. 5 illustrates the use of time diversity to stagger the return of equipment back to their normal load levels so to not again immediately overload the system. Now, whether through prior programming or random selection, the equipment is brought back to its normal load levels more gradually. This results in a smoother transition back to the normal load level on a power distribution system. In this regard, it will be recalled that this effect can be similarly achieved by gradually reducing the load shed for all load controlled equipment at the same time over a prescribed period of time or cycles of operation.

In FIG. 6, the time diversity feature of the invention is applied to the front end of the LCE as well as to its termination. As shown in FIG. 6, rather than all the affected equipment immediately having their loads reduced to the programmed levels, the load reduction is staggered so to provide a smooth rather than an abrupt transition. The result is an overall load control profile which is much smoother than that shown in FIG. 4, and which is significantly less stressful on the distribution system.

A further feature of the method of the invention is the ability to cancel or terminate a load control event and involves coming out of the event using the time diversity and shed ramp down strategies described above. As an example, load control is to last 3 hours, and the time diversity value for a piece of equipment is 10 minutes. If an event cancel command occurs after 2 hours, load control is completely over 2 hours and 10 minutes after it started. This feature thus preserves the system's capability of "easing" out of the load control behavior; i.e., easing load back in, if a load control event is cancelled.

This capability of easing in of load is the same as that employed by LCU 10 if a power outage were to occur. That is, when the outage is resolved, all of the equipment affected by the outage is not brought back online at the same time. Rather, the LCU employs a strategy similar to that described above to bring the equipment online without precipitating a load control event. If the outage is only temporary, LCU 10 continues with any previous load control event.

Feedback in the system is directly related to control parameters such that if asked to shed a certain percentage of equipment load, for example, LCU 10 can track the actual percentage of load shedding and adjust the control pattern accordingly, thus to achieve the desired percentage of load shed.

Feedback also takes the form of information to the utility wherein LCU 10 can respond to the utility that it has achieved the desired percentage; or if not, by how much variance there is from the desired value. This capability eliminates the need for the utility to perform calculations based on cycle counters, which do not guarantee performance on an individual level, and eliminates the need to correlate metering data with the control period to determine if the load control was successful. This also reduces the need for utilities to create complex models to determine, statistically, if load will be shed as desired.

Throughout a load control event, the amount of time a piece of equipment E is allowed to run, actually runs, and was actively shed is computed. These measurements provide useful metrics for determining the performance of load control strategies and commands. In the above example, the control parameter was a desired load shedding of 50%. Based upon actual run time, the achieved load shed percentage may have been, for example, 49.8%. This information can be reported back to the utility and provides readily comparable metrics for performance assessment throughout the load control event.

Once the load control event concludes, LCU 10 reports back to the utility the facts that the event took place and the actual percentage of load shed based on the usage profile for each piece of controlled equipment involved in the event. This information can also be presented to a local user by means of a connected or wireless user interface. How much information is reported depends upon what information the utility or local user requires. A higher level of abstraction in reporting reduces the amount of data LCU 10 must report, via TWACS, RF, or other mode of communication, so an end user can compute the system's performance. For example, LCU 10 may only report a count of how many times the load represented by a piece of equipment cycled naturally (i.e., the user turned the equipment "on" and "off" or the equipment turned "on" and "off" as it is programmed to do) versus how many times it was controlled by a load control command from the LCU. However, it will be understood that some systems may require an actual usage measurement from a metering device to observe the actual reduction in demand during the control period. The reported information provides feedback to the system so that patterns of load control and control strategies can be modified as appropriate based upon actual occurrences.

In addition to reporting this information back to the utility, LCU 10 further uses this information to evaluate and modify the algorithm it employs to execute a load shedding strategy during subsequent load control events. This increases the efficiency of the load control unit during subsequent events and improves the overall performance of the unit at these times.

In view of the above, it will be seen that the several objects and advantages of the present disclosure have been achieved and other advantageous results have been obtained.

The invention claimed is:

1. In an electrical distribution system by which a utility supplies electricity to one or more pieces of equipment at each utility's customer's location, each piece of equipment placing an electrical load on the system when it is operating, a method of shedding electrical load placed on the system comprising:
   connecting at least one piece of equipment at a location to a load control apparatus;
   profiling by the load control apparatus, on a temporal basis, the electricity usage of the piece of equipment, said profiling being characterized not by the amount of energy consumed by the piece of equipment during a defined interval of time, but rather by the duration of time during each of successive predetermined intervals of time the piece of equipment was energized or de-energized with the resulting load profile including a plurality of time duration values of energization or de-energization with each value being specific to each of the successive predetermined intervals within the resulting load profile;
   when a load control event occurs in which load on the system must be shed, shedding load by the load control apparatus as a function of the resulting load profile created for the piece of equipment thereby to prevent system instability or overload, and to control operating costs of the system, and wherein the load shedding occurs during predetermined time intervals and wherein during each time interval of the event shedding load occurs as a function of the each value specific to a particular time interval within the resulting load profile associated with each of the predetermined time intervals of the load control event; and,
   if the load control event extends across more than one interval within the time period over which the energization profile is established, the amount of energy shed by the piece of equipment will differ if the profile indicates that the energization of the piece of equipment varies from the current interval to a succeeding interval.

2. The method of claim 1 in which the profiling includes determining the amount of time during a predetermined time interval each piece of equipment uses electricity so to produce a separate energization profile for each piece of load controlled equipment, the amount of load shed by the piece of equipment during a load control event being based upon the energization profile for the piece of equipment for the time of the event, and in response to a command from the load control apparatus with the shedding of load for each piece of equipment during the event varying in accordance with the profile for that piece of equipment and in accordance with the specific load profile time interval during which the shedding occurs.

3. The method of claim 2 in which each energization profile includes cycling of the respective piece of equipment "on" and "off" during the predetermined time intervals, and all of the energization profiles together representing the aggregate usage of electricity by all the pieces of load controlled equipment at any time within the interval.

4. The method of claim 2 including periodically updating the piece of equipment's energization profile once it has been produced.

5. The method of claim 4 in which the energization profile is updated upon a change in parameters affecting load energization including replacement of the piece of equipment, a change in the customer using the equipment, or a change in the season.

6. The method of claim 5 further including adjusting the energization profile as a function of changes in system time.

7. The method of claim 2 in which the piece of equipment's energization profile is continuously updated.

8. The method of claim 2 in which the time that load control cycling for load controlled pieces of equipment occurs is delayed so to extend the time when shedding occurs across the boundaries of time intervals.

9. The method of claim 2 in which the shedding of load is further a function of when a load controlled piece of equipment is powered during the load control event.

10. The method of claim 9 further including modifying load control of a piece of equipment during a load control event to take into account any short cycle limits for the piece of equipment.

11. The method of claim 9 further shedding load by the piece of equipment as a function of short cycle limits for the piece of equipment, wherein the short cycle limits define a minimum run time and a minimum shed time for the piece of equipment so to protect the equipment if its operation requires an equalization of operational characteristics which, if not equalized, would result in damage to the equipment.

12. The method of claim 2 in which load shed commands are also issued directly by the utility in addition to load shed commands issued by the load control apparatus and the method further includes programming the load control apparatus with a pre-established priority scheme that determines with which particular command the load control apparatus must comply when conflicting commands occur.

13. The method of claim 2 in which energization profiling is suspended during, and for a period of time subsequent to termination of a load control event so the effects of load control during the event do not affect the energization profile.

14. The method of claim 1 in which profiling by the load control apparatus includes sensing when electricity is being supplied to a piece of equipment and providing an indication thereof to the load control apparatus.

15. The method of claim 14 in which energization of a piece of equipment is estimated during a power outage so that the equipment's energization profile is updated even without sensing of the equipment's power usage.

16. The method of claim 1 in which the method further includes selectively controlling each piece of load controlled equipment to stagger the shedding of load by the equipment at the beginning of a load control event and to stagger the restoring of the equipment load at the end of the event thereby facilitating a smooth transition into and out of load control during the event.

17. The method of claim 1 further including restoring load to the system when a load control event terminates, restoring of the load for each piece of load controlled equipment being in accordance with the energization profile for that piece of equipment.

18. The method of claim 17 in which restoring load to the system is controlled so to gradually reduce the amount of shed load over a predetermined time period, or number of load cycles, whereby as the pieces of load controlled equipment are fully brought back online, the electrical distribution system does not experience a spike in demand such as would initiate another load controlled event.

19. The method of claim 18 further including cancelling a load control event and bringing the load controlled equipment back online in the controlled manner so to gradually reduce the amount of shed load over a predetermined time period, or number of load cycles.

20. The method of claim 19 in which, if the load control event is cancelled, the load controlled equipment is brought back online by extending the period of control for each piece of load controlled equipment, the period being separately chosen for each piece of equipment in accordance with the energization profile for that piece of equipment, thereby to diversify the time for re-establishing the load.

21. The method of claim 17 in which the load controlled equipment is brought back online by extending the period of control for each piece of load controlled equipment in accordance with the energization profile for that piece of equipment, the period being separately chosen for each piece of equipment, thereby to diversify the time for re-establishing the load.

22. The method of claim 17 in which all load controlled pieces of equipment are fully brought back online at the same time rather than staggered over a period of time.

23. The method of claim 1 in which pieces of equipment remote from the load control apparatus are energization profiled by load control logic units of the load control apparatus located in proximity to each respective piece of equipment, each load control logic unit storing the energization profile for its associated piece of equipment and controlling the shedding of the load by the load control apparatus during a load control event.

24. The method of claim 23 in which the load control apparatus wirelessly communicates with the load control logic units for the remote pieces of equipment to command the shedding of load by these pieces of equipment during a load control event in accordance with the energization profile for each piece of equipment.

25. The method of claim 1 further including the load control apparatus reporting to the utility, during and after a load control event, the performance of load control strategies and commands issued by the utility so the performance of the load control strategies and commands can be determined as well as the load control unit modifying, if necessary, an algorithm employed thereby to execute a load control strategy during a load control event.

26. The method of claim 25 in which the load control unit computes the amount of time a piece of equipment is allowed to run, actually runs, and sheds load during the load control event and reports this information.

27. The method of claim 26 further including the load control apparatus utilizing information relating to the performance of load shed based on the energization profile for each piece of load controlled equipment involved in the event, so that patterns of load control and load control strategies can be modified based upon actual load control events.

28. The method of claim 1 further including shedding load using a capping protocol in which load shedding is based upon an assumed, rather than an actual, energization profile with the assumed profile representing the maximum dispatchable load for a given piece of equipment for a given interval.

29. In an electrical distribution system by which a utility supplies electricity to one or more pieces of equipment at each utility's customer's location, each piece of equipment placing an electrical load on the system when it is operating, a load control apparatus connected to the pieces of equipment and controlling the shedding of electrical load placed on the system by the respective pieces of equipment comprising:

a power sensor connected to each piece of equipment and sensing when electricity is being supplied to that piece of equipment;

a load control logic unit responsive to inputs from the sensor for profiling, on a temporal basis, the electricity usage of the piece of equipment, said profiling being characterized not by the amount of energy consumed by the piece of equipment during a defined interval of time, but rather by the duration of time during each of successive predetermined intervals of time the piece of equipment was energized or de-energized with the resulting load profile including a plurality of time duration values of energization or de-energization with each value being specific to each of the successive predetermined intervals within the profile;

a load control switch for shutting off electricity to each piece of equipment during occurrence of a load control event in which load on the system must be shed, the load control apparatus shedding load as a function of the energization profiles created for each piece of equipment thereby to prevent system instability or overload, and to control operating costs of the system, and wherein the load shedding for each piece of equipment occurs during predetermined time intervals and wherein during each time interval of the event shedding load occurs as a function of the each value specific to a particular time interval within the resulting load profile associated with each of the predetermined time intervals of the load control event; and, if the load control event extends across more than one interval within the time period over which the energization profile is established, the amount of energy shed by the piece of equipment will differ if the profile indicates that the energization of the piece of equipment varies from the current interval to a succeeding interval.

30. The load control apparatus of claim 29 in which there is a separate load control logic unit for each piece of load controlled equipment and each load control logic unit produces an energization profile for its associated piece of equipment by identifying those periods of time during a predetermined time interval during which the piece of equipment uses electricity and the length of time of usage of electricity, the amount of load shed by each piece of equipment during a load control event being based upon the energization profile for the piece of equipment for the time of the event with the shedding of load for each piece of equipment during the event varying in accordance with the profile for that piece of equipment and in accordance with the specific load profile time interval during which the shedding occurs.

31. The load control apparatus of claim 29 in which each load control logic unit updates the energization profile for its associated piece of equipment except during, and for a period of time subsequent to termination of a load control event, so the effects of load control during the event do not affect the profile.

32. The load control apparatus of claim 29 in which some pieces of equipment are directly connected to the apparatus while other pieces of equipment are remote to the apparatus and the load control apparatus has a wireless communications link for communicating with the load control logic unit associated with the remotely located equipment.

33. The load control apparatus of claim 29 for self-generating load control commands to shed load when a load control event occurs.

34. The load control apparatus of claim 33 which is further responsive to load shed commands issued directly by the utility, the apparatus further being programmed with a pre-established priority scheme that determines with which particular command the load control apparatus must comply when conflicting commands occur.

35. The load control apparatus of claim 34 in which commands issued by the utility are communicated to the apparatus using a two-way automatic communications system.

36. The load control apparatus of claim 29 which, once a load control event terminates, restores load to the electrical distribution system in a controlled manner based upon the energization profiles for the load controlled pieces of equipment so to gradually reduce the amount of shed load over a predetermined time period, or number of load cycles, whereby as the pieces of load controlled equipment are fully brought back online, the electrical distribution system does not experience a spike in demand such as would initiate another load controlled event.

37. The load control apparatus of claim 29 for reporting back to the utility, during and after a load control event, that a load control event occurred, and the performance of load shed based on the energization profile for each piece of load controlled equipment involved in the event.

38. In an electrical distribution system by which a utility supplies electricity to one or more pieces of equipment at each utility's customer's location, each piece of equipment placing an electrical load on the system when it is operating, a method of controlling operation of the equipment in a distributed manner throughout a load control event so to effectively manage the total load placed on the distribution system throughout the event by pieces of controlled equipment individually shedding load and subsequently restoring load comprising:

providing a load control apparatus communicating load control commands to each piece of load control equipment, the apparatus being directly connected to a piece of equipment located proximate to the apparatus or communicating with a piece of equipment located remotely from the apparatus over a communications link;

profiling by the load control apparatus the electricity usage of the piece of equipment, the profile being temporally based and continuously updated to reflect recent usage of the equipment, said profiling being characterized not by the amount of energy consumed by the piece of equipment during a defined interval of time, but rather by the duration of time during each of successive predetermined intervals of time the piece of equipment was energized or de-energized with the resulting load profile including a plurality of time duration values of energization or de-energization with each value being specific to each of the successive predetermined intervals within the resulting load profile;

when a load control event occurs in which load on the distribution system must be shed, shedding of load by the load control apparatus, including the timing of shedding throughout the load control event, is a function of the resulting load profile created for the piece of equipment and load control information specific to that piece of equipment, the load shedding occurring during predetermined time intervals and wherein during each time interval of the event shedding load occurs as a function of the the each value specific to a particular time interval within the resulting load profile associated with each of the predetermined time intervals for the load control event, and if the load control event extends across more than one interval within the time period over which the energization profile is established, the amount of energy shed by the piece of equipment will differ if the profile indicates that the energization of the piece of equipment varies from the current interval to a succeeding interval; and, the restoring of the load at the end of the event by a piece of equipment, including the timing thereof, is further a function of the energization profile for the piece of equipment and load control information specific to that piece of equipment, the shedding and restoring of load including controlling each piece of equipment to stagger the shedding of load by the equipment at the beginning of the event and to stagger the restoring of the equipment load at the end of the event thereby to facilitate a smooth transition into and out of load control so as to provide system stability throughout the event.

\* \* \* \* \*

UNITED STATES PATENT AND TRADEMARK OFFICE
CERTIFICATE OF CORRECTION

PATENT NO. : 8,433,452 B2
APPLICATION NO. : 12/558122
DATED : April 30, 2013
INVENTOR(S) : Christopher K. Fleck et al.

It is certified that error appears in the above-identified patent and that said Letters Patent is hereby corrected as shown below:

In the Specifications:

In Column 6, line 3, after the word "for" add the word --a--.

In Column 11, line 30, please delete the word "That" and replace it with the word --The--.

In Column 11, line 33, after the word "4:00" add the word --to--.

Signed and Sealed this
Ninth Day of July, 2013

Teresa Stanek Rea
*Acting Director of the United States Patent and Trademark Office*